United States Patent
Dickinson

(10) Patent No.: US 11,124,192 B2
(45) Date of Patent: Sep. 21, 2021

(54) ELECTRIFIED VEHICLE CONFIGURED TO SELECTIVELY INCREASE ENERGY RECOVERY THRESHOLD BASED ON FRICTION PREDICTION AND CORRESPONDING METHOD

(71) Applicant: Ford Global Technologies, LLC, Dearborn, MI (US)

(72) Inventor: George Taylor Dickinson, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 181 days.

(21) Appl. No.: 16/539,027

(22) Filed: Aug. 13, 2019

(65) Prior Publication Data
US 2021/0046939 A1 Feb. 18, 2021

(51) Int. Cl.
*B60W 40/068* (2012.01)
*B60L 15/20* (2006.01)
*B60W 30/18* (2012.01)

(52) U.S. Cl.
CPC ....... *B60W 40/068* (2013.01); *B60L 15/2009* (2013.01); *B60L 15/2045* (2013.01); *B60W 30/18127* (2013.01)

(58) Field of Classification Search
CPC ........... B60W 40/068; B60W 30/18127; B60L 15/2045; B60L 15/2009; Y02T 10/72
See application file for complete search history.

(56) References Cited

U.S. PATENT DOCUMENTS

| 4,962,969 | A | 10/1990 | Davis |
| 5,229,955 | A | 7/1993 | Nishiwaki et al. |
| 5,358,317 | A | 10/1994 | Cikanek |
| 7,571,967 | B2 | 8/2009 | Saito et al. |
| 8,851,043 | B1* | 10/2014 | Coney ....................... F02G 5/02 |
| | | | 123/197.4 |
| 10,289,920 | B2 | 5/2019 | Hartmann |
| 2006/0055240 | A1* | 3/2006 | Toyota .................. B60W 10/06 |
| | | | 303/152 |
| 2015/0274159 | A1* | 10/2015 | Lu .......................... B60W 30/02 |
| | | | 701/82 |
| 2016/0236672 | A1* | 8/2016 | Yanagida ............... B60T 8/1755 |
| 2017/0160745 | A1* | 6/2017 | Lauffer ................. B60W 30/18 |
| 2018/0354492 | A1* | 12/2018 | Meyer .................... B60K 6/485 |
| 2019/0232774 | A1* | 8/2019 | Zedan ....................... B60K 6/10 |
| 2019/0337391 | A1* | 11/2019 | Crombez ............ B60L 15/2036 |
| 2020/0361469 | A1* | 11/2020 | McCollough ............. B60L 7/10 |

* cited by examiner

*Primary Examiner* — Mussa A Shaawat
(74) *Attorney, Agent, or Firm* — David B. Kelley; Carlson, Gaskey & Olds, P.C.

(57) ABSTRACT

This disclosure relates to an electrified vehicle configured to selectively increase an energy recovery threshold based on a friction prediction, and a corresponding method. In particular, an example electrified vehicle includes an energy recovery mechanism configured to apply a negative wheel torque up to a negative wheel torque threshold. The electrified vehicle also includes a controller configured to selectively increase the negative wheel torque threshold based on a predicted coefficient of friction between a tire of the electrified vehicle and a road surface.

13 Claims, 2 Drawing Sheets

ELECTRIFIED VEHICLE CONFIGURED TO SELECTIVELY INCREASE ENERGY RECOVERY THRESHOLD BASED ON FRICTION PREDICTION AND CORRESPONDING METHOD

TECHNICAL FIELD

This disclosure relates to an electrified vehicle configured to selectively increase an energy recovery threshold based on a friction prediction, and a corresponding method.

BACKGROUND

Generally, electrified vehicles are selectively driven using one or more battery-powered electric machines. Electric machines can drive electrified vehicles instead of, or in addition to, an internal combustion engine. Example electrified vehicles include all-electric vehicles, hybrid electric vehicles (HEVs), plug-in hybrid electric vehicles (PHEVs), fuel cell vehicles, and battery electric vehicles (BEVs). Some electrified vehicles use energy recovery mechanisms, such as regenerative braking systems, to recover energy. The recovered energy is typically stored within a battery until the energy is used to power the electric machines.

SUMMARY

An electrified vehicle according to an exemplary aspect of the present disclosure includes, among other things, an energy recovery mechanism configured to apply a negative wheel torque up to a negative wheel torque threshold, and a controller configured to selectively increase the negative wheel torque threshold based on a predicted coefficient of friction between a tire of the electrified vehicle and a road surface.

In a further non-limiting embodiment of the foregoing electrified vehicle, the controller is configured to increase the negative wheel torque applied by the energy recovery mechanism when a predicted coefficient of friction between the tire and the road surface exceeds a predefined value.

In a further non-limiting embodiment of any of the foregoing electrified vehicles, the controller is in electronic communication with a neural network configured to predict the coefficient of friction between the tire and the road surface.

In a further non-limiting embodiment of any of the foregoing electrified vehicles, the neural network is configured to provide a confidence factor corresponding to the predicted coefficient of friction between the tire and the road surface.

In a further non-limiting embodiment of any of the foregoing electrified vehicles, the neural network is either local to the electrified vehicle or remote from the electrified vehicle.

In a further non-limiting embodiment of any of the foregoing electrified vehicles, the neural network is configured to predict the coefficient of friction between the tire and the road surface based at least one of (1) recent wheel control data, (2) weather prediction data, (3) a comparison of torque data versus acceleration data, and (4) ambient condition data.

In a further non-limiting embodiment of any of the foregoing electrified vehicles, the ambient conditions include a measured exterior temperature surrounding the electrified vehicle.

In a further non-limiting embodiment of any of the foregoing electrified vehicles, when the predicted coefficient of friction between the tire and the road surface exceeds the predefined value, the controller is configured to increase the negative wheel torque threshold in proportion to the confidence factor.

In a further non-limiting embodiment of any of the foregoing electrified vehicles, the confidence factor is a numerical value between 0 and 1, and, when the predicted coefficient of friction between the tire and the road surface exceeds the predefined value, the controller is configured to increase the negative wheel torque threshold by an amount equal to a maximum increase amount multiplied by the confidence factor.

In a further non-limiting embodiment of any of the foregoing electrified vehicles, the energy recovery mechanism is configured to apply a negative torque to at least one wheel of the electrified vehicle.

In a further non-limiting embodiment of any of the foregoing electrified vehicles, the energy recovery mechanism is a regenerative braking system configured to selectively resist rotation of at least one wheel of the electrified vehicle.

In a further non-limiting embodiment of any of the foregoing electrified vehicles, the vehicle further includes a battery pack. The controller is configured to selectively direct power from the energy recovery mechanism to the battery pack.

In a further non-limiting embodiment of any of the foregoing electrified vehicles, the electrified vehicle is a hybrid electric vehicle.

A method according to an exemplary aspect of the present disclosure includes, among other things, applying a negative wheel torque from an energy recovery mechanism to at least one wheel of an electrified vehicle at a level up to a negative wheel torque threshold, and increasing the negative wheel torque threshold based on a predicted coefficient of friction between a tire of the electrified vehicle and a road surface.

In a further non-limiting embodiment of the foregoing method, the method includes generating a confidence factor corresponding to the predicted coefficient of friction.

In a further non-limiting embodiment of any of the foregoing methods, a neural network predicts the coefficient of friction and generates the confidence factor.

In a further non-limiting embodiment of any of the foregoing methods, the increasing step includes increasing the negative wheel torque threshold by an amount proportional to the confidence factor.

In a further non-limiting embodiment of any of the foregoing methods, the confidence factor is a numerical value between 0 and 1, and the increasing step includes increasing the negative wheel torque threshold by an amount equal to a maximum increase amount multiplied by the confidence factor.

In a further non-limiting embodiment of any of the foregoing methods, the electrified vehicle is a hybrid electric vehicle.

DETAILED DESCRIPTION

This disclosure relates to an electrified vehicle configured to selectively increase an energy recovery threshold based on a friction prediction, and a corresponding method. In particular, an example electrified vehicle includes an energy recovery mechanism configured to apply a negative wheel torque up to a negative wheel torque threshold. The electrified vehicle also includes a controller configured to selectively increase the negative wheel torque threshold based on a predicted coefficient of friction between a tire of the electrified vehicle and a road surface. This disclosure has a number of other benefits which will be appreciated from the following description. Among them, this disclosure increases the availability of regenerative braking, which lessens the degradation of the vehicle's friction brakes, while maintaining stability and without causing an undue increase in noise and/or vibrations. This disclosure may also improve fuel economy.

Figure 1:
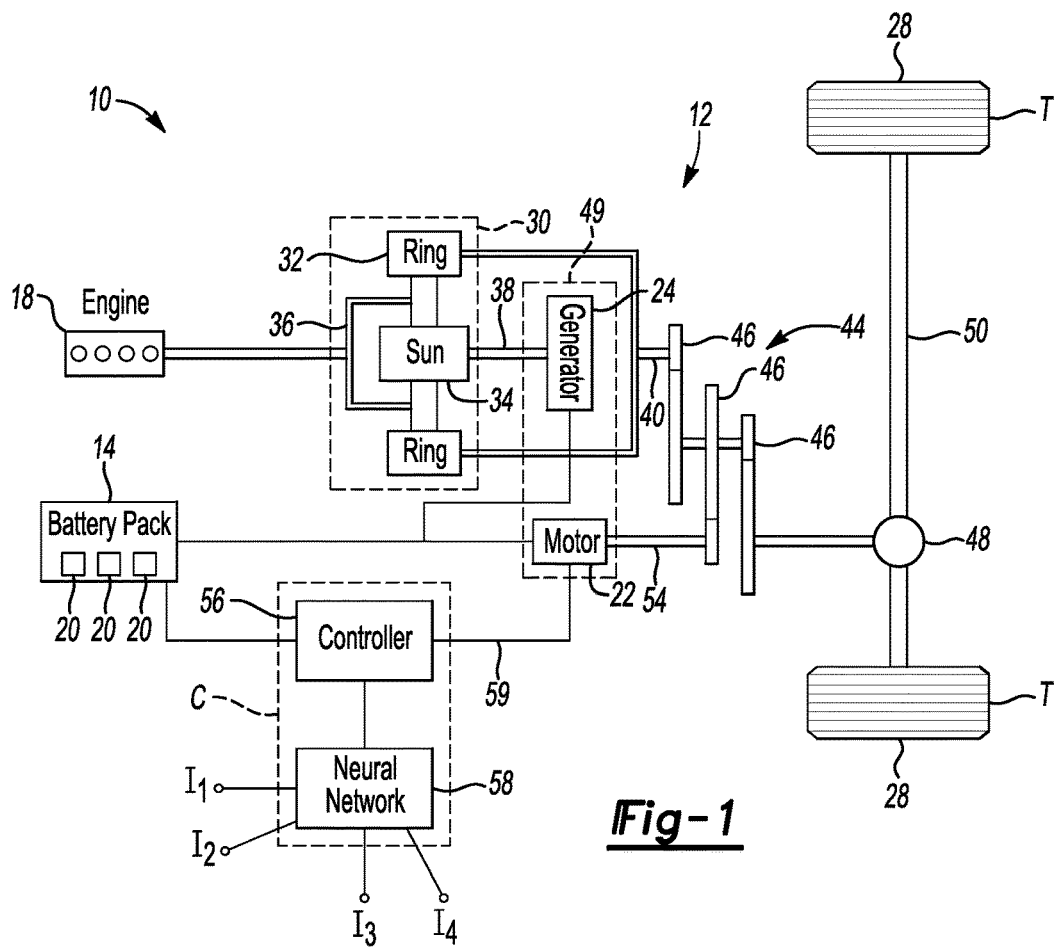
FIG. 1 schematically illustrates an example powertrain of an electrified vehicle.

FIG. 1 schematically illustrates an example powertrain 10 for an electrified vehicle 12 ("vehicle 12"), which in this example is a hybrid electric vehicle (HEV). The powertrain 10 may be referred to as a hybrid transmission. Although depicted as an HEV, it should be understood that the concepts described herein are not limited to HEVs and could extend to other electrified vehicles, including, but not limited to, plug-in hybrid electric vehicles (PHEVs), battery electric vehicles (BEVs) and fuel cell vehicles (FCVs). This disclosure also extends to various types of hybrid vehicles including full hybrids, parallel hybrids, series hybrids, mild hybrids, micro hybrids, and plug-in hybrids. Further, the vehicle 12 is depicted schematically in FIG. 1, but it should be understood that this disclosure is not limited to any particular type of vehicle, and extends to cars, trucks, sport utility vehicles (SUVs), vans, etc.

With continued reference to FIG. 1, a battery pack 14, sometimes referred to as a vehicle battery or simply a battery, and an internal combustion engine 18 selectively operate with the powertrain 10. The battery pack 14 includes arrays 20 of rechargeable battery cells. In this disclosure, any reference to the battery pack 14 also includes, where appropriate, the arrays 20 of battery cells. The powertrain 10 includes a motor 22 and a generator 24, both of which are types of electric machines. The motor 22 and generator 24 may be separate or may have the form of a combined motor-generator.

Figure 2:
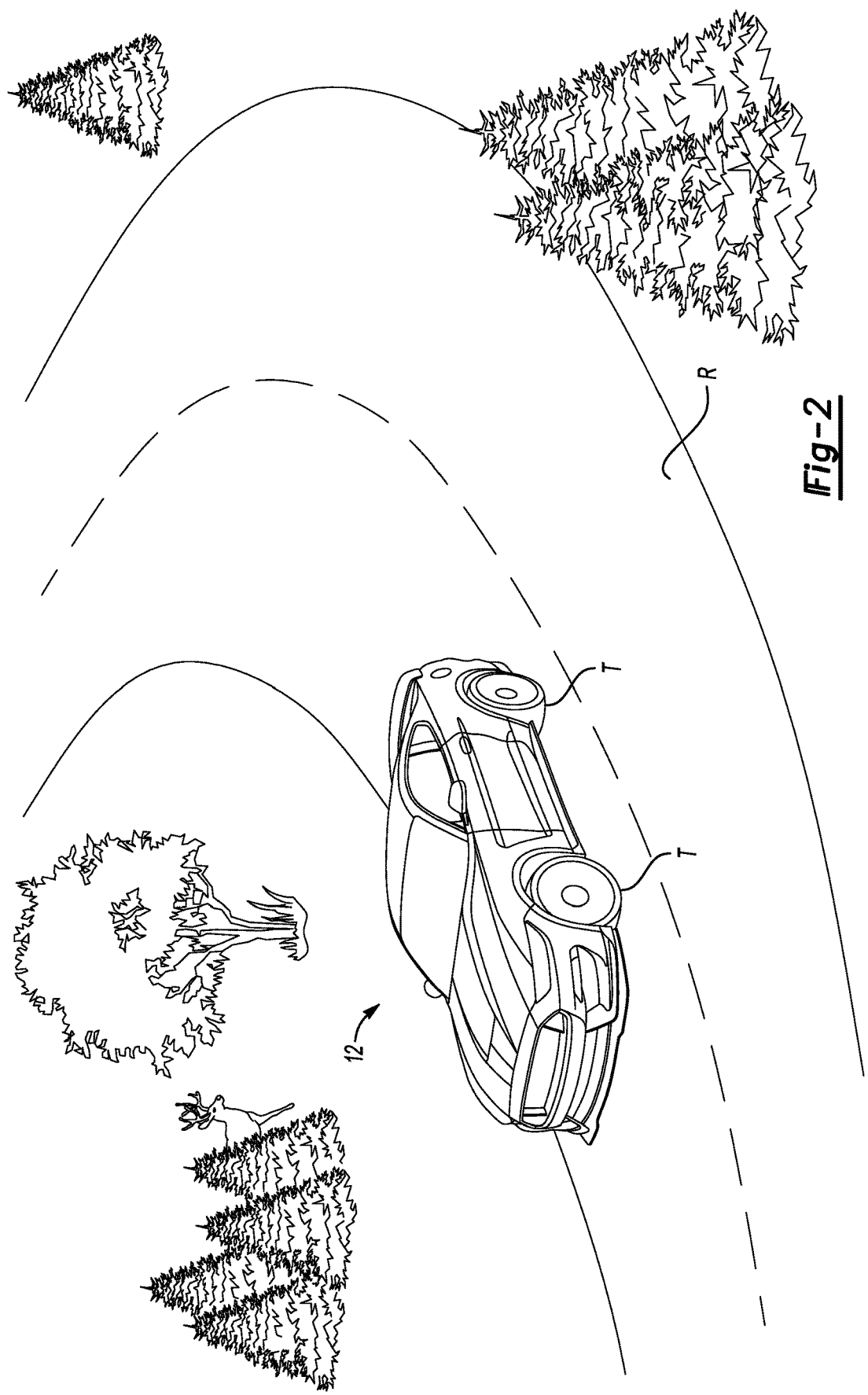
FIG. 2 illustrates an electrified vehicle traveling on a road surface and, in particular, descending a grade.

In the embodiment of FIG. 1, the powertrain 10 is a power-split transmission that employs a first drive system and a second drive system. The first and second drive systems generate torque to drive one or more sets of vehicle drive wheels 28, which include tires T configured to directly contact a road surface R (FIG. 2). While two vehicle drive wheels 28 are shown in FIG. 1, this disclosure is not limited to vehicles with two wheels, and extends to vehicles with two or more wheels, some or all of which may be drive wheels. The first drive system includes a combination of the engine 18 and the generator 24. The second drive system includes at least the motor 22, the generator 24, and the battery pack 14. The motor 22 and the generator 24 are portions of an electric drive system of the powertrain 10.

The engine 18 and the generator 24 may be connected through a power transfer unit 30, such as a planetary gear set. Other types of power transfer units, including other gear sets and transmissions, can be used to connect the engine 18 to the generator 24. In one non-limiting embodiment, the power transfer unit 30 is a planetary gear set that includes a ring gear 32, a sun gear 34, and a carrier assembly 36.

The generator 24 can be driven by the engine 18 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 18, for example, to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28. The motor 22 can be selectively employed to drive the vehicle drive wheels 28 by outputting torque to a shaft 54 that is also connected to the second power transfer unit 44.

Further, in this embodiment, the motor 22 and the generator 24 cooperate as part of an energy recovery mechanism 49, which in this example is a regenerative braking system, in which both the motor 22 and the generator 24 can be employed as motors to output torque. For example, the motor 22 and the generator 24 can each output electrical power to recharge cells of the battery pack 14.

The vehicle 12 may additionally include or be in electronic communication with a computing system C. The computing system C, in this example, includes a controller 56 and a neural network 58. The controller 56 is configured to monitor and/or control various aspects of the powertrain 10 and associated vehicle 12. For example, the controller 56 may communicate with the electric drive system, the power transfer units 30, 44, and/or other sensors and components to monitor various conditions of the vehicle 12, control the vehicle 12, or both. The controller 56 includes electronics, software, or both, to perform the necessary control functions for operating the vehicle 12. In one non-limiting embodiment, the controller 56 is a combination vehicle system controller and powertrain control module (VSC/PCM). Although it is shown as a single device, the controller 56 may include multiple controllers in the form of multiple hardware devices, or multiple software controllers within one or more hardware devices. A controller area network (CAN) 59, illustrated schematically, allows the controller 56 to communicate with the various components of the vehicle 12.

The computing system C also includes a neural network 58. The neural network, in one example, is remote from the vehicle 12 and is in electronic communication with controller 56. In particular, the neural network 58 may be a cloud-based computing tool. The neural network 58 may be local to the vehicle 12 in another example, however. The neural network 58 is configured to receive inputs $I_1$-$I_4$ indicative of various conditions of the vehicle 12 either directly from sensors associated with the vehicle, from the controller 56, or from other sources. While four inputs $I_1$-$I_4$ are shown in FIG. 1, the neural network 58 may receive one or more inputs. The neural network 58 is configured to process information, namely from the inputs $I_1$-$I_4$, and generate predictions and send those predictions to the controller 56, which is configured to issue commands to various components of the vehicle 12 corresponding to the predictions. The neural network 58 may self-train over time and use collected data to make future predictions. While a neural network 58 is shown in FIG. 1, this disclosure is not limited to neural networks and includes other learning tools such as probabilistic models used to make inferences or predictions. In another embodiment, a lookup table or algorithm is used in place of a neural network.

The example vehicle 12 is a hybrid-electric vehicle having a powertrain, such as the powertrain 10. In another particular example, the vehicle 12 is an all-electric vehicle incorporating a regenerative braking system. In still other examples, the vehicle could be a vehicle incorporating an energy recovery mechanism other than a regenerative braking system.

As mentioned above, the motor 22 and the generator 24 cooperate as part of a regenerative braking system. The regenerative braking system, again, is a type of energy recovery mechanism 49. The regenerative braking system can be used to reduce, or maintain, the speed of the vehicle, while recovering energy and generating power for use by the vehicle 12.

Typically, the energy recovered by the regenerative braking system is stored in the battery pack 14. The regenerative braking system is used to apply a negative torque to the wheels 28 to maintain a speed, decelerate, or to limit acceleration of the vehicle 12 down a grade, for example. Depending on various conditions, such as desired vehicle speed, the steepness of the grade, etc., the vehicle 12 may vary a level of negative torque applied to the wheels by the energy recovery mechanism 49. A condition of particular consideration in this disclosure is the coefficient of friction between the tires T and the road surface R, as will be discussed below. In general, the applied level of negative torque is proportional to the power generated by the regenerative braking system.

In order to prevent unwanted behaviors of the vehicle 12, such as vibrations, noise, etc., the level of negative torque applied to the wheels 28 by the energy recovery mechanism 49 is limited to an energy recovery threshold, namely a negative wheel torque threshold. The negative wheel torque threshold is a level of negative wheel torque below which the energy recovery mechanism 49 will not cause the vehicle 12 to exhibit unwanted behaviors such as undue vibrations and/or noise. In this sense, the negative wheel torque threshold may be considered a capacity or upper limit. The negative wheel torque threshold corresponds directly or proportionally to a maximum regenerative braking threshold. The negative wheel torque threshold also corresponds directly or proportionally to a predefined maximum desired deceleration rate of the vehicle 12.

The negative wheel torque threshold may originally be a predefined value stored in the controller 56 and set by the manufacturer of the vehicle 12. In particular, the manufacturer may originally set the negative wheel torque threshold based on a designed mass of the vehicle 12 and other factors, including a predicted coefficient of friction between the tires T and the road surface R during use of the vehicle 12. As is known, a coefficient of friction is a unitless number that determines the amount of friction between materials in contact, in this case the tires T and the road surface R.

In this disclosure, the controller 56 is configured to selectively increase the negative wheel torque threshold based on a predicted coefficient of friction between the tires T of the vehicle 12 and a road surface R (FIG. 2). Here, the road surface R is the surface of a road the vehicle 12 is driving on, or, in the case of a prediction, predicted to drive on, and which directly contacts, or is predicted to contact, the tires T. The term road surface R refers to all surfaces which contact the tires T during use of the vehicle 12, including gravel surfaces, ground surfaces, parking lots, bridges, concrete surfaces, asphalt surfaces, etc., and, while inclusive of traditional roads, the term is not limited strictly to "roads."

In some conditions, the energy recovery mechanism 49 can apply negative wheel torque in excess of the original, manufacturer-set negative wheel torque threshold while maintaining stability and without the vehicle 12 experiencing unwanted vehicle behaviors such as increased noise and/or vibrations. Such conditions include when the coefficient of friction between the tires T and the road surface R is predicted to be above a predefined threshold.

FIG. 2 is representative of an example condition where the vehicle 12 may be able to apply negative wheel torque in excess of the original, manufacturer-set negative wheel torque threshold. In particular, in FIG. 2, the vehicle 12 is descending a relatively steep grade. FIG. 2 is also representative of a condition in which it is not raining, the road surface R is dry, it is relatively warm outside, and the coefficient of friction between the road surface R and the tires T is otherwise predicted to be above a predefined value, which is a predefined threshold value that may be set by a manufacturer of the vehicle 12, for example. As such, the vehicle 12 will be able to resist unwanted vehicle behaviors as regenerative braking and negative wheel torque levels increase. In such conditions, the controller 56 is configured to increase the negative wheel torque threshold dynamically and in real time.

The controller 56 may selectively increase the negative wheel torque in conditions other than those shown in FIG. 2. For instance, the vehicle 12 need not be descending a grade. Other example conditions include the vehicle 12 coasting or decelerating from a relatively high speed on a relatively flat grade. This disclosure extends to other conditions where regenerative braking may occur.

Figure 3:
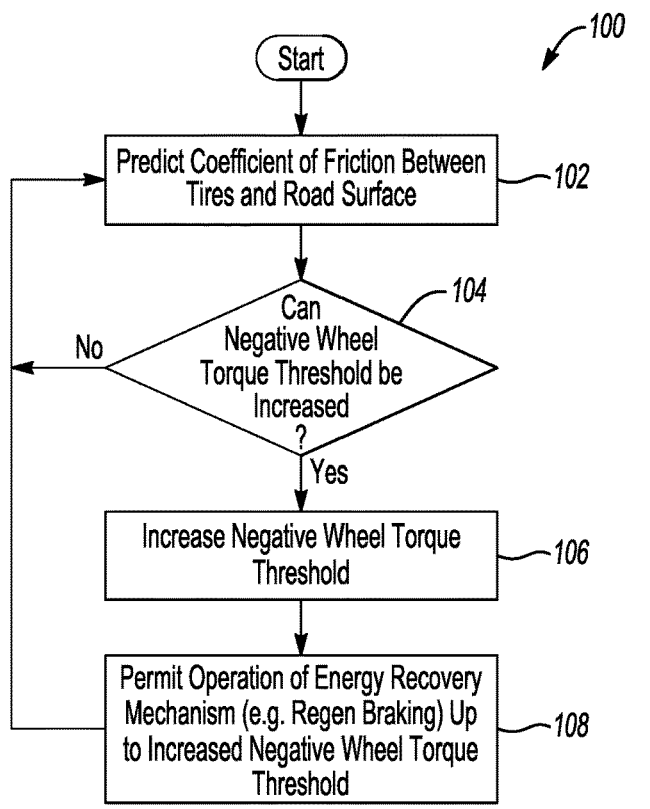
FIG. 3 is a flow chart representative of an example method of this disclosure.

FIG. 3 is a flow chart representative of an example method 100 of this disclosure. Various aspects of the vehicle 12, including an example control logic of the computing system C, will now be described with reference to FIG. 3 and with continued reference to FIGS. 1 and 2.

The method 100 begins, at 102, with the computing system C predicting the coefficient of friction between the tires T and the road surface R. In a particular example, the neural network 58 is configured to predict the coefficient of friction between the tires T and the road surface R and generate a confidence factor corresponding to the predicted coefficient of friction between the tires T and the road surface R.

The neural network 58, in one example, makes the prediction and provides the confidence factor based on various inputs $I_1$-$I_4$. Example inputs include at least one of (1) recent wheel control data, (2) weather prediction data, (3) a comparison of torque data versus acceleration data, and (4) ambient condition data. Regarding recent wheel control data, the neural network 58 may receive inputs indicative of recent wheel events such as tire slippage or traction control events. If, for example, a tire has recently slipped or traction control was recently activated, the neural network 58 may predict a relatively low coefficient of friction and/or generate a lower confidence factor. Regarding weather prediction data, the neural network 58 is in communication with a service configured to provide a weather report for the location of the vehicle 12 and/or the expected location of the vehicle 12 based on an expected destination and travel plan, for example. If the weather report indicates that the vehicle 12 will be traveling in warm, sunny conditions, the neural network 58 may predict a relatively high coefficient of friction and/or provide a higher confidence factor. The neural network 58 also considers recent weather events such as whether it has recently rained or snowed in a particular location, for example, when making the prediction and/or providing the confidence factor. Regarding the comparison of torque data versus acceleration data, the neural network 58 is configured to consider the real time traction of the tires T when making the prediction and/or providing the confidence factor. For instance, if the comparison of torque data versus acceleration data indicates that there is a relatively high level of traction, the neural network 58 may predict a relatively high coefficient of friction and/or provide a relatively high confidence factor. Regarding ambient conditions, the neural network 58 may consider information from sensors local to the vehicle 12, for example, to determine various external environmental conditions immediately surrounding the vehicle 12, such as temperature, pressure, humidity, wind, etc. The neural network 58 may consider other inputs such as inputs from other vehicle sensors, such as LIDAR and RADAR sensors (if present). The neural network 58 may also consider windshield wiper status, rain sensor data, etc.

At 102, the neural network 58 uses fuzzy logic, for example, to consider each of the inputs and predict a coefficient of friction between the tires T and the road surface R. The predicted coefficient of friction is a numerical value. If the predicted coefficient of friction is higher than a predefined value, then the controller 56 may increase the negative wheel torque threshold. The predefined value may represent a baseline coefficient of friction expected in most conditions between the tires T and the road surface R. This disclosure takes advantage of conditions where the coefficient of friction is higher than the baseline level to provide more regenerative braking.

At 102, the neural network 58 also generates and provides the controller 56 a confidence factor corresponding to the predicted coefficient of friction. The confidence factor, in one example, is a numerical value between 0 and 1, with 0 indicating a minimum level of confidence and 1 indicating a maximum level of confidence. The confidence factor is essentially a percentage between 0 and 100%. The confidence factor is dependent on the nature of the inputs $I_1$-$I_4$. If all inputs $I_1$-$I_4$ point toward a high likelihood that the coefficient of friction between the tires T and road surface R is in excess of the predefined value, then the confidence factor will be close to 1 if not 1. On the other hand, if, for example, three of the inputs $I_1$-$I_4$ point toward there being a high likelihood that the coefficient of friction is in excess of the predefined value, while one input points against there being an excess coefficient of friction, then the confidence factor will be less than 1.

At 104, the controller 56 considers the results of the neural network 58 or, if no neural network 58 is present, the lookup table or algorithm, etc., and determines whether the predicted coefficient of friction is greater than the predefined value. If so, the controller 56 increases the negative wheel torque threshold, at 106. In one example, the controller 56 increases the negative wheel torque threshold by an amount indicated by the neural network 58. The amount, in one example, is proportional to the confidence factor. In a particular example, when the neural network 58 predicts that the coefficient of friction is above the predefined value, the controller 56 is configured to increase the negative wheel torque applied by the energy recovery mechanism by an amount equal to a maximum increase amount multiplied by the confidence factor. The maximum increase amount is an amount in excess of the negative wheel torque threshold set by the manufacturer, for example. The controller 56, at 106, will increase the negative wheel torque threshold to the maximum increase amount if the confidence factor is 1. The controller 56 will increase the negative wheel torque threshold to less than the maximum increase amount if the confidence factor is less than 1.

At 108, with the negative wheel torque threshold raised, the controller 56 sends various instructions to the powertrain 10 of the vehicle 12 to permit the energy recovery mechanism 49 to apply negative wheel torque to the wheels 28 up to the increased negative wheel torque threshold set in step 106. In particular, the controller 56 sends instructions to permit regenerative braking up to the increased negative wheel torque threshold. The method 100 continues, adjusting the negative wheel torque threshold as necessary based on changes to the predicted coefficient of friction.

It should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
an energy recovery mechanism configured to apply a negative wheel torque up to a negative wheel torque threshold; and
a controller configured to selectively increase the negative wheel torque threshold based on a predicted coefficient of friction between a tire of the electrified vehicle and a road surface.

2. The electrified vehicle as recited in claim 1, wherein the controller is configured to increase the negative wheel torque applied by the energy recovery mechanism when a predicted coefficient of friction between the tire and the road surface exceeds a predefined value.

3. The electrified vehicle as recited in claim 2, wherein the controller is in electronic communication with a neural network configured to predict the coefficient of friction between the tire and the road surface.

4. The electrified vehicle as recited in claim 3, wherein the neural network is configured to provide a confidence factor corresponding to the predicted coefficient of friction between the tire and the road surface.

5. The electrified vehicle as recited in claim 3, wherein the neural network is either local to the electrified vehicle or remote from the electrified vehicle.

6. The electrified vehicle as recited in claim 4, wherein the neural network is configured to predict the coefficient of friction between the tire and the road surface based at least one of (1) recent wheel control data, (2) weather prediction data, (3) a comparison of torque data versus acceleration data, and (4) ambient condition data.

7. The electrified vehicle as recited in claim 6, wherein the ambient conditions include a measured exterior temperature surrounding the electrified vehicle.

8. The electrified vehicle as recited in claim 4, wherein, when the predicted coefficient of friction between the tire and the road surface exceeds the predefined value, the controller is configured to increase the negative wheel torque threshold in proportion to the confidence factor.

9. The electrified vehicle as recited in claim 8, wherein:
the confidence factor is a numerical value between 0 and 1, and
when the predicted coefficient of friction between the tire and the road surface exceeds the predefined value, the controller is configured to increase the negative wheel torque threshold by an amount equal to a maximum increase amount multiplied by the confidence factor.

10. The electrified vehicle as recited in claim 1, wherein the energy recovery mechanism is configured to apply a negative torque to at least one wheel of the electrified vehicle.

11. The electrified vehicle as recited in claim 10, wherein the energy recovery mechanism is a regenerative braking system configured to selectively resist rotation of at least one wheel of the electrified vehicle.

12. The electrified vehicle as recited in claim 1, further comprising a battery pack, wherein the controller is configured to selectively direct power from the energy recovery mechanism to the battery pack.

13. The electrified vehicle as recited in claim 1, wherein the electrified vehicle is a hybrid electric vehicle.

\* \* \* \* \*